United States Patent [19]
Suenaga

[11] Patent Number: 5,978,155
[45] Date of Patent: Nov. 2, 1999

[54] ADAPTERS FOR CORRECTING SPHERICAL ABERRATIONS OF OBJECTIVE LENS

[75] Inventor: Yutaka Suenaga, Yokohama, Japan

[73] Assignee: Nikon Corporation, Tokyo, Japan

[21] Appl. No.: 09/023,397

[22] Filed: Feb. 13, 1998

[30] Foreign Application Priority Data

Feb. 14, 1997 [JP] Japan ................................. 9-044878

[51] Int. Cl.⁶ .................................................. G02B 15/14
[52] U.S. Cl. .......................................... 359/691; 359/676
[58] Field of Search .................................... 359/676, 691, 359/684, 692, 754, 771, 781, 782, 783, 793

[56] References Cited

U.S. PATENT DOCUMENTS 5,796,530   8/1998   Oshita ...................................... 359/692

*Primary Examiner*—Hung Xuan Dang
*Attorney, Agent, or Firm*—Klarquist Sparkman Campbell Leigh & Whinston, LLP

[57] ABSTRACT

Objective lenses (e.g., for microscopy), and adapters for such lenses, are disclosed providing adjustability of the amount of spherical aberration imparted to an image by an objective lens due to variations in cover glass thickness. The adapter can be axially inserted imagewise of the objective lens, or between a first objective lens and a second objective lens of an objective lens system. The adapter comprises an axially movable lens group comprising a cemented lens including a negative lens and a positive lens and a cemented surface having negative refractive power. Spherical aberration of the objective lens is adjusted by axially moving the movable lens group. Where $r_1$ is the curvature radius of the cemented surface, $n_P$ is the refractive index of the positive lens, $n_N$ is the refractive index of the negative lens, the lens satisfies the condition $|(n_N-n_P)/r_1|<0.3$.

14 Claims, 8 Drawing Sheets

H=H'

H>H'

ADAPTERS FOR CORRECTING SPHERICAL ABERRATIONS OF OBJECTIVE LENS

FIELD OF THE INVENTION

This invention pertains to light microscopy. More specifically, the invention pertains to adapter lenses that are used in connection with a microscope objective lens system (or other objective lens system) to correct spherical aberrations arising from variations in the refractive index and thickness of a refractive body (e.g., cover glass, laboratory dish, parallel plate) located between a specimen and the objective lens system.

BACKGROUND OF THE INVENTION

In light microscopy, cover glasses or laboratory dishes and the like are frequently used to cover, enclose, or protect the specimen. Microscope objective lenses intended to be used with cover glasses and the like normally specify a specific refractive index and thickness of the cover glass. Consequently, whenever the thickness or refractive index of the cover glass or laboratory dish is not as specified for the objective lens, spherical aberrations can arise that degrade imaging performance of the objective lens and reduce contrast of the image.

Metallurgical microscopes and the like used to observe metal and semiconductor surfaces typically utilize objective lenses that are not designed to be used with a cover glass or other refractive body between the specimen and the objective lens. Thus, such objective lenses are designed without consideration of the thickness of a refractive body through which the lens would otherwise view the object. In actual practice, however, there are times when a glass plate or the like must be used to protect the surface of a semiconductor wafer or integrated circuit during microscopic examination. In such instances, the generation of spherical aberrations by the plate can make high-quality observations of the specimen impossible.

Immersion objective lenses adapted to be used with an immersion fluid such as water or oil are also adapted to be used with such fluids having a particular refractive index. If the refractive index of the immersion fluid changes, then unwanted spherical aberrations can arise that make high-quality observations impossible.

In certain conventional objective lenses intended for use with a refractive body situated between the objective lens and the specimen (e.g., cover glass or wall of a laboratory dish), an adjustable correcting lens (adjusted by turning a so-called "correcting ring") is conventionally employed to vary the internal spacing between lenses or lens groups within the objective lens. The amount by which the lens spacing is adjusted is a function of the amount of spherical aberration generated by the refractive body. The adjustment serves to offset changes in such spherical aberration as viewed by the observer. Microscope objective lenses of this sort are disclosed in Japanese laid-open patent document nos. Sho 60-205521 and Sho 60-247613.

Conventional adjustable objective lenses require that a considerable amount of air space be provided in front of (i.e., objectwise) and behind (i.e., imagewise) certain lens groups in the objective lens to provide a sufficient range of adjustment. Such space requirements significantly limit the degrees of freedom that can be exploited in the design of the objective lens, thus increasing the difficulty with which the performance of the lens can be optimized.

Another problem with conventional adjustable objective lenses is that the mechanical device used to move the movable lens(es) lenses had to be located in the objective lens. This undesirably increased the size and complexity of the objective lens.

With conventional objective lenses that are not designed to be used with an intervening cover glass or the like between the lens and the specimen, if a specimen were observed with a cover glass in place, spherical and other aberrations caused by the thickness of the cover glass reduce the contrast of the observed image, thus making high-quality observations impossible.

SUMMARY OF THE INVENTION

In view of the shortcomings of the prior art, as summarized above, the present invention provides, inter alia, adapters intended to be used with an objective lens system (e.g., microscope objective lens systemA) for adjusting the spherical aberration of the objective lens system.

A preferred embodiment of an adapter comprises, from the object side to the image side, a movable lens group comprising a negative lens cemented to a positive lens to define a cemented surface having negative refractive power. The movable lens group is axially movable on the optical axis. The adapter satisfies at least the following condition:

$$|(n_N - n_P)/r_1| < 0.3$$

wherein $n_P$ is the refractive index of the positive lens, $n_N$ is the refractive index of the negative lens, and $r_1$ is the curvature radius of the cemented surface. The adapter is axially mountable to an objective lens system. If the objective lens system comprises only one objective lens, then the adapter is axially placed on the image side of the objective lens. If the objective lens system comprises first and second objective lenses (the second objective lens being, e.g., a so-called "tube lens" or "imaging lens"), then the adapter is axially placed between the first objective lens and the second objective lens. Movement of the movable lens group along the optical axis relative to the objective lens system allows correction of spherical aberration of an image formed by the objective lens system.

The adapter preferably also satisfies the conditions:

$$-0.6 < (f_P + f_N)/(f_P - f_N) < 0.6$$

$$-0.4 < (\nu_P - \nu_N)/\nu_P < 0.4$$

wherein $f_P$ is the focal length of the positive lens, $f_N$ is the focal length of the negative lens, $\nu_P$ is the Abbe number (relative to d-line light) of the positive lens, and $\nu_N$ is the Abbe number (relative to d-line light) of the negative lens.

The adapter can further comprise a first lens group situated imagewise of the movable lens group and a second lens group situated imagewise of the first lens group. The first lens group has a negative refractive power and a focal length $f_1$, and the second lens group has a positive refractive power and a focal length $f_2$. Such an adapter further satisfies the condition:

$$-0.6 < (f_2 + f_1)/(f_2 - f_1) < 0.6$$

The adapter can also comprise a positive lens situated objectwise of the movable lens group.

According to another aspect of the invention, objective lens systems are provided. A first representative embodiment of such a system comprises, objectwise to imagewise on an optical axis, an objective lens and an adapter removably attached to the image side of the objective lens. The adapter is coaxial with the objective lens when attached to the objective lens, and comprises a movable lens group comprising a negative lens cemented to a positive lens. The resulting cemented surface has a negative refractive power and a curvature radius $r_1$. The movable lens group satisfies at least the condition:

$$|(n_N-n_P)/r_1|<0.3$$

in which the variables are as defined above. The movable lens group is movable on the optical axis relative to the first objective lens to adjust an amount of spherical aberration produced by the objective lens.

In the foregoing lens system, the adapter can further satisfy the conditions:

$$-0.6<(f_P+f_N)/(f_P-f_N)<0.6$$

$$-0.4<(\nu_P-\nu_N)/\nu_P<0.4$$

in which the variables are as defined above. The adapter can further comprise a first lens group situated imagewise of the movable lens group and a second lens group situated imagewise of the first lens group. The first lens group has a negative refractive power and a focal length $f_1$, and the second lens group has a positive refractive power and a focal length $f_2$. Such an adapter can further satisfies the condition:

$$-0.6<(f_2+f_1)/(f_2-f_1)<0.6$$

Another representative embodiment of an objective lens system further comprises a first objective lens and a second objective lens situated axially imagewise of the first objective lens. The adapter is situated between the first objective lens and the second objective lens.

According to another aspect of the invention, objective lens systems are provided that exhibit variable spherical aberration correction. One representative embodiment of such a lens system comprises, objectwise to imagewise on an optical axis, an objective lens and a spherical-aberration-correcting lens group (adapter) situated on the image side of the objective lens. Another representative embodiment comprises a first objective lens and a second objective lens, with the spherical-aberration-correcting lens group situated between the first objective lens and the second objective lens. In either instance, the spherical-aberration-correcting lens group comprises an axially movable cemented lens including a negative lens cemented to a positive lens for adjusting the spherical aberration of the objective lens(es). The spherical-aberration-correcting lens group preferably is removable from the objective lens(es).

The cemented lens preferably has a cemented surface having a negative refractive power. The lens system preferably satisfies the condition:

$$|(n_N-n_P)/r_1|<0.3$$

in which the variables are as defined above.

The lens system can further satisfy the conditions:

$$-0.6<(f_P+f_N)/(f_P-f_N)<0.6$$

$$-0.4<(\nu_P-\nu_N)/\nu_P<0.4$$

in which the variables are as defined above.

The spherical-aberration-correcting lens group can further comprise a first lens group situated imagewise of the movable lens group, and a second lens group situated imagewise of the first lens group. The first lens group has a negative refractive power and a focal length $f_1$, and the second lens group has a positive refractive power and a focal length $f_2$. The system preferably further satisfies the condition:

$$-0.6<(f_2+f_1)/(f_2-f_1)<0.6$$

The foregoing and additional features and advantages of the present invention will be more readily apparent from the following detailed description which proceeds with reference to the accompanying drawings.

DETAILED DESCRIPTION

Figure 1:
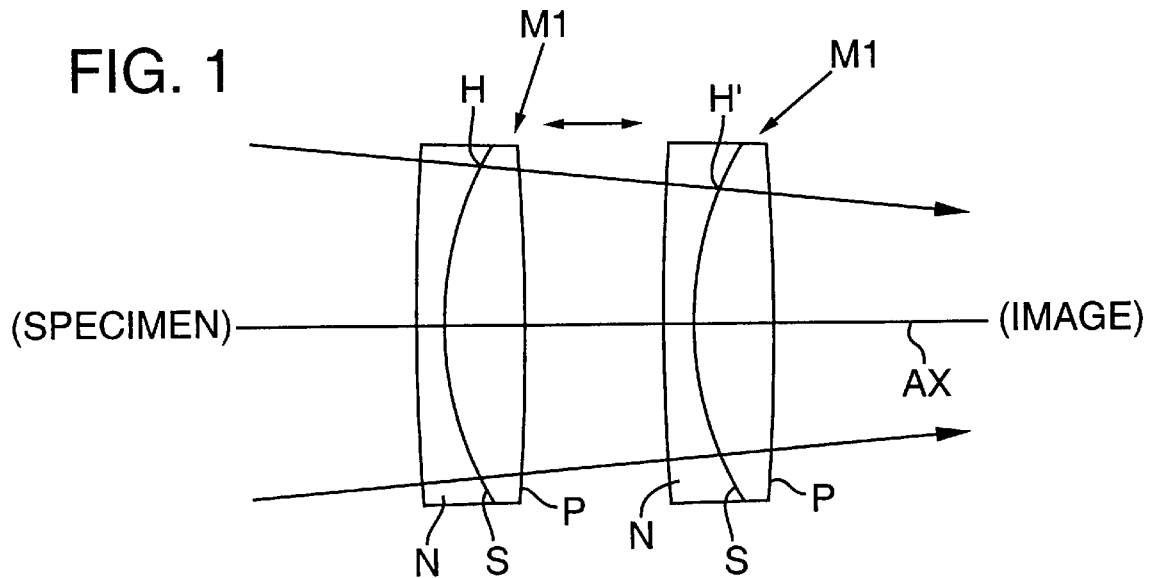
FIG. 1 depicts general aspects of the placement and movement of an adapter lens according to the invention, in a converging light flux; this figure accompanies a discussion herein of the effect of the adapter lens on spherical aberrations.

The present invention is directed to spherical-aberration-correcting adapter lens assemblies ("adapters") used in conjunction with a microscope objective lens system or analogous lens system. An adapter according to the invention can serve to effectively cancel (or at least significantly reduce) spherical aberrations that otherwise would exist in the image formed by the objective lens system due to variations in the thickness or other refractive property of a "cover glass" placed between a specimen and the objective lens system.

As used herein, a "cover glass" is understood to encompass any of various conventional cover glasses, coverslips, laboratory dishes, plates, immersion fluids, and the like that can be placed between the objective lens system and the specimen, typically to protect or contain the specimen. Cover glasses according to this definition can be made of any suitable transparent material, such as glass or plastic, and thus exhibit a refractive property with respect to light passing through the cover glass.

The adapters according to the invention are preferably detachable from the objective lens. Thus, an adapter can be attached to the objective lens (e.g., inserted between an objective lens and an image plane of the objective lens, or inserted between a "first" objective lens and a "second" objective lens), inserted between an objective lens system and the objective-lens turret, or between the turret and the image formed by the objective lens system. By axially moving the movable lens group in the adapter, spherical aberrations generated by variations in the thickness or other refractive characteristic of the cover glass can be cancelled or otherwise controlled to the desired degree.

An adapter according to the invention generally comprises an axially movable lens group comprising a cemented lens M1 (FIG. 1) including (objectwise to imagewise) a negative lens N and a positive lens P. The axially movable lens group can also comprise, as required, additional single and/or cemented lenses. The cemented lens can further comprise additional lens(es) as required; e.g., the cemented lens can be a cemented triplet (positive-positive-negative, or negative-positive-negative). The cemented surface S of the cemented lens M1 has a negative refractive power. Spherical aberration is corrected by axially moving the movable lens group. The adapter preferably satisfies the following condition:

$$|(n_N - n_P)/r_1| < 0.3 \quad (1)$$

wherein $r_1$ is the curvature radius of the cemented surface, $n_P$ is the refractive index of the positive lens P, and $n_N$ is the refractive index of the negative lens N of the cemented lens M1.

Condition (1) stipulates the appropriate degree of spherical-aberration correction imparted by the cemented surface S of the cemented lens M1 in the movable lens group. Exceeding the upper limit of condition (1) reduces the effect on correcting spherical aberration. I.e., the change in spherical aberration imparted by the movable lens group is prohibitively small per unit movement of the movable lens group along the optical axis AX, thereby providing insufficient correction of spherical aberration. Falling below the lower limit causes a higher order spherical aberration, which makes it difficult to effectively correct aberrations.

An adapter according to the invention also preferably satisfies conditions (2) and (3):

$$-0.6 < (f_P + f_N)/(f_P - f_N) < 0.6 \quad (2)$$

$$-0.4 < (\nu_P - \nu_N)/\nu_P < 0.4 \quad (3)$$

wherein $f_P$ and $f_N$ are the focal lengths of the positive lens P and the negative lens N, respectively, of the cemented lens M1, and $\nu_P$ and $\nu_N$ are the Abbe numbers (relative to d-line light; $\lambda = 587.6$ nm) of the positive and negative lenses P, N, respectively.

Condition (2) establishes an appropriate range of focal lengths of lenses in the movable lens group. Exceeding the upper limit or falling below the lower limit of condition (2) causes the refractive index of the entire movable lens group to be so high that axially moving the movable lens group in an effort to correct spherical aberration causes excessive movement of the image. Such a situation makes it prohibitively difficult to ascertain whether image contrast has degraded due to defocusing or to spherical aberration. This, in turn, makes it prohibitively difficult to find a setting at which spherical aberration is optimally corrected, and to focus the image.

Exceeding the upper limit of condition (3) causes an excessive change in the correction of chromatic aberrations by the movable lens group whenever the movable lens group is axially moved, thus changing the "balance" achieved by correction of chromatic aberration. This also causes a reduction in contrast. Falling below the lower limit of condition (3) renders the movable lens group incapable of providing sufficient correction of chromatic aberrations as the movable lens group is axially moved. This results in degraded contrast with a change in the "balance" of chromatic aberration correction, making high-quality observations impossible.

Figure 13:
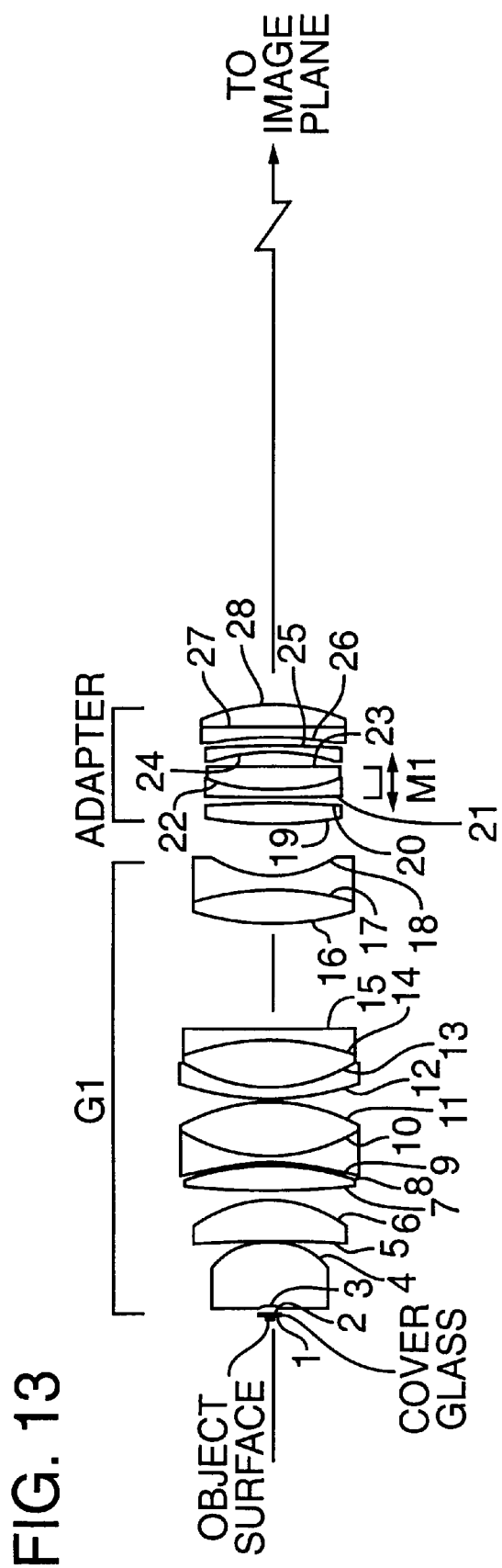
FIG. 13 is an optical diagram of an objective lens system according to the invention, comprising an objective lens and an adapter located on the image side of the objective lens.

The adapter of the present invention is preferably co-axially mounted with respect to the objective lens system. In the case of a so-called "infinite correction" objective lens system, the objective lens system with which the adapter is used typically comprises a "first" objective lens and a "second" objective lens (the second objective lens being, e.g., a so-called "tube lens" or "imaging lens"). With such a system, the adapter is preferably inserted coaxially ("intercalated") between the first objective lens and the second objective lens. (FIG. 3, for example, shows the adapter intercalated between first and second objective lenses of an infinite-correction objective lens system.) A so-called "finite" correction" system typically lacks a second objective lens because imaging is performed by one objective lens. With a finite correction system the adapter is inserted between the actual objective lens and the image plane of the objective lens. (FIG. 13 shows the adapter inserted on the image side of an objective lens of a finite-correction objective lens system.)

Figure 2:
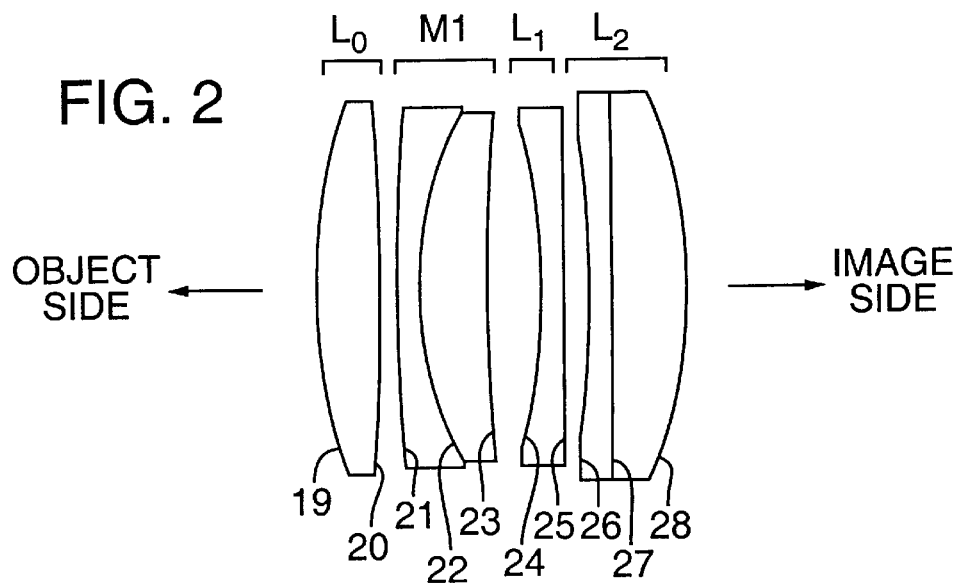
FIG. 2 is an optical diagram of an adapter lens according to Example Embodiment 1 of the invention.

Especially whenever the adapter is inserted into a parallel optical flux (such as between a first objective lens G1 and a second objective lens G2 of an objective lens system having infinite correction), the following condition (4) is preferably satisfied, especially whenever the adapter comprises (in addition to the movable group) a negative lens $L_1$ and a positive lens $L_2$:

$$-0.6 < (f_2 + f_1)/(f_2 - f_1) < 0.6 \quad (4)$$

wherein $f_1$ is the focal length of the negative lens $L_2$, and $f_2$ is the focal length of the positive lens $L_2$. Such an adapter is shown in FIG. 2. It will be understood that the adapter shown in FIG. 2 can be inserted into either a parallel light flux or a non-parallel light flux.

A function of the movable lens group (comprising the cemented lens M1) is illustrated in FIG. 1, which shows, by way of example, the cemented lens M1 in two different positions along the optical axis AX. In FIG. 1, a light flux from a point on an object (e.g., on the specimen) propagates along an optical axis AX and is converged by lenses in the objective lens situated toward the specimen. Moving the cemented lens M1 along the optical axis AX changes spherical aberration. I.e., in FIG. 1, when the movable lens group is placed in a convergent light flux, the entrance height H of the light flux on the cemented surface S of the cemented lens M1 changes. The greater the height H of the light flux incident on the cemented surface, the greater the spherical aberration imparted by the cemented surface. Thus, changing the height H correspondingly changes the spherical aberration.

Figure 11A:
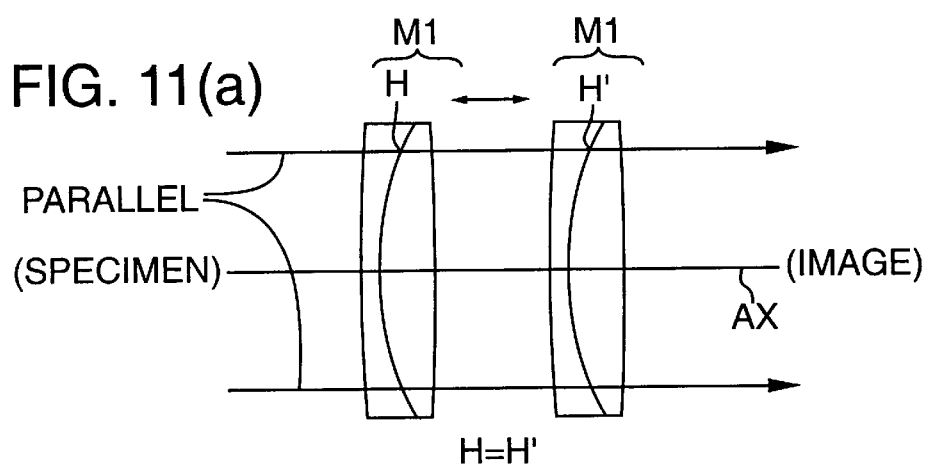
FIG. 11(a) depicts axial movement of the movable lens group relative to rays of an "infinite correction" objective lens.
Figure 11B:
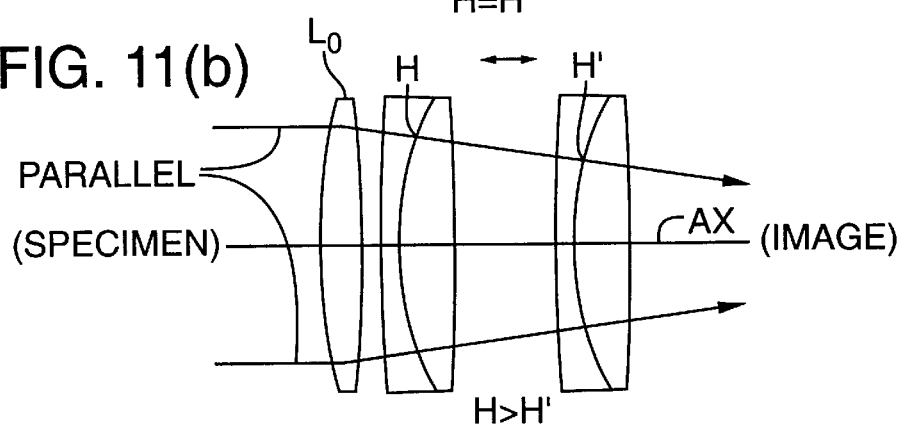
FIG. 11(b) depicts axial movement of the movable lens group in a system as depicted in FIG. 11(a) but including the lens group $L_0$.

If the light flux between the first objective lens and the second objective lens of the objective lens system is parallel, the objective lens system is characteristically an "infinite correction" objective lens system. If an axially movable lens group as described above were to be inserted between the first objective lens and the second objective lens of such a system, the height H (and thus spherical aberration) would not change with axial movement of the movable lens group, no matter how far along the optical axis the movable lens group were moved (FIG. 11(a)). To make the adapter functional in such a situation, a lens group $L_0$ (see, e.g., FIG. 2), preferably having a positive refractive power, can be inserted between the movable lens group and the first objective lens G1 of the objective lens system; the lens $L_0$ causes the light flux to be not parallel (preferably convergent) to the optical axis, and enables the movable lens group to provide variable control of the amount of spherical-aberration correction (FIG. 11(b)). I.e., with such a configuration, moving the movable lens group along the optical axis would cause a corresponding change in the height H and thus a corresponding change in spherical aberration. The adapter in such a configuration comprises the movable lens group and the lens group $L_0$.

Figure 12A:
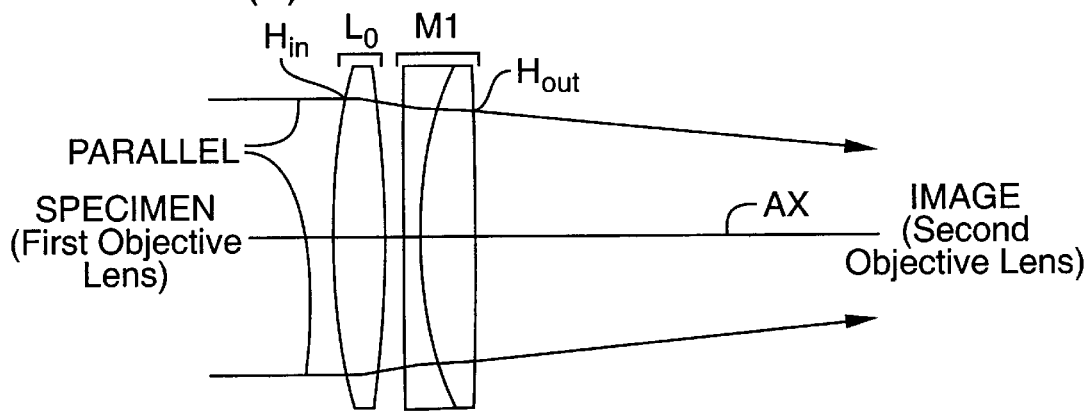
FIG. 12(a) is an optical diagram of an adapter according to the invention comprising the cemented movable lens group M1 and the positive lens $L_0$, producing a convergent downstream light flux.
Figure 12B:
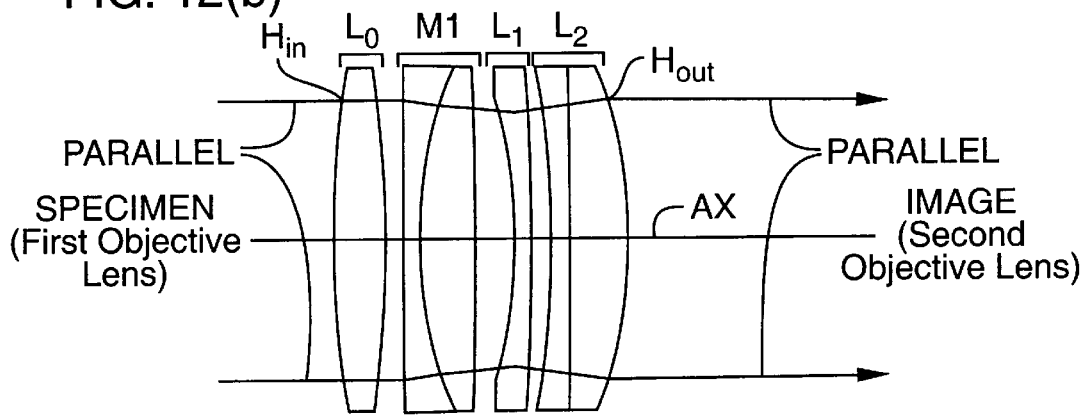
FIG. 12(b) is an optical diagram of an adapter according to the invention comprising the cemented movable lens group M1, the positive lens $L_0$, and the lenses $L_1$, and $L_2$, producing a parallel downstream light flux.

With an objective lens system that includes a first objective lens and a second objective lens, the movable lens group, and the lens $L_0$, the light flux leaving the movable lens group may not be parallel to the optical axis (FIG. 12(a)). Thus, the image plane of the objective lens system changes with movement of the movable lens group along the optical axis. This can complicate use of the objective lens system for microscopy. To correct such a situation, a negative lens group $L_1$ can be used in combination with a positive lens group $L_2$ on the image side of the movable lens group (FIG. 12(b)) to restore the image plane to the same position on the optical axis at which the image plane was located before the adapter was inserted. In such a configuration, the adapter comprises the lens group $L_0$, the movable lens group M1, the negative lens $L_1$, and the positive lens $L_2$.

Exceeding the upper limit or falling below the lower limit of condition (4) disrupts the desired balance of power between the positive lens $L_2$ and the negative lens $L_1$, which increases the absolute value of the Petzval's sum of the adapter. This, in turn, degrades the flatness of the image plane of the objective lens system.

An adapter according to the invention is axially inserted at least on the image side of an objective lens. Thus, in a "finite correction" objective lens system as representatively depicted in FIG. 13, the resulting corrected objective lens system comprises the objective lens G1 and the adapter. The adapter shown in FIG. 13 comprises an axially movable lens group comprising a cemented lens $M_1$ including a positive lens P and a negative lens N.

Figure 3:
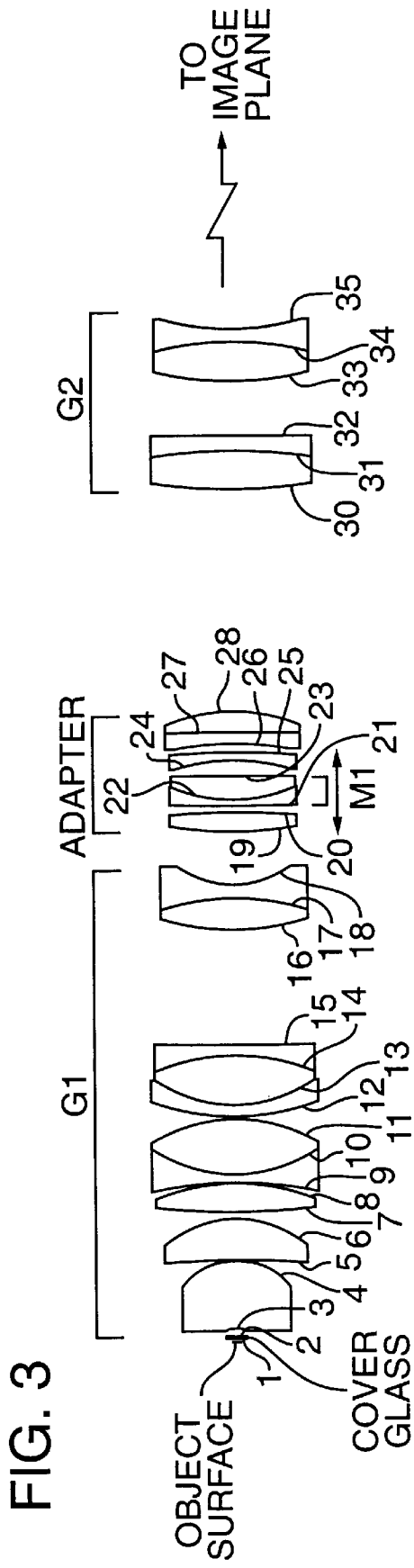
FIG. 3 is an optical diagram of the adapter lens of Example Embodiment 1 in axial alignment with a microscope objective lens.

In an "infinite correction" objective lens system as representatively depicted in FIG. 3 and corrected by including an adapter, the resulting corrected objective lens system comprises the adapter intercalated between the first objective lens G1 and the second objective lens G2.

Adapters (and objective lens systems) according to the invention now make it possible to correct spherical aberrations that would otherwise arise in an existing objective lens system used with, e.g., cover glasses having any thickness within a range of thicknesses rather than only a single specified thickness. This is accomplished by inserting an adapter according to the invention on the image side of an objective lens or between a first objective lens and a second objective lens of an objective lens system. This eliminates the need to use a "correcting ring" objective lens with its inherent limitations. Also, with a single adapter according to the invention, a much greater flexibility of microscopic observations can be realized without having to have on hand a large assortment of expensive objective lenses for correcting spherical aberrations arising from any of various cover glass thicknesses.

Several example embodiments of the invention are described below, which represent the current best mode of the invention. It will be understood that the invention is not intended to be limited to these example embodiments.

Example Embodiment 1

An adapter according to this example embodiment is shown in FIG. 2. FIG. 3 shows the adapter of FIG. 2 intercalated between a first objective lens G1 and a second objective lens G2 of a microscope objective lens system exhibiting "infinite correction." In FIG. 3, the first objective lens G1 has a focal length $f_{G1}$=10 mm, and the second objective lens has a focal length $f_{G2}$=200 mm. The magnification of the entire objective lens system shown in FIG. 3 is 20×, and the numerical aperture is 0.75.

Specifications for the objective lens system shown in FIG. 3 are listed in Tables 1 and 2. Data are listed in order from the object side. Table 1 lists optical data concerning the first and second objective lenses G1, G2 without the adapter being inserted; and Table 2 lists optical data with the adapter inserted. In each of Tables 1 and 2, the first column lists lenses, the second column lists surface numbers, the third column lists curvature radii (r), the fourth column lists axial distances (D) between adjacent surfaces, the fifth column lists refractive indices n(d) relative to d-line light ($\lambda$=587.6 nm), and the sixth column lists Abbe numbers ν(d) relative to d-line light of the respective optical components.

Tables 1 and 2 also list a lens mirror and tube prism that are not shown in FIG. 1.

TABLE 1

| Lens | Surface No. | r (mm) | D (mm) | n (d) | ν (d) |
|---|---|---|---|---|---|
| C. Glass | 1 | 0.00000 | t | 1.522160 | 58.802 |
| " | 2 | 0.00000 | $d_0$ | | |
| G1 | 3 | −4.80110 | 9.25000 | 1.693500 | 53.718 |
| " | 4 | −8.57140 | 0.10000 | | |
| " | 5 | −61.98900 | 5.55000 | 1.497820 | 82.516 |
| " | 6 | −13.88870 | 1.00000 | | |
| " | 7 | 83.46600 | 3.70000 | 1.497820 | 82.516 |
| " | 8 | −27.20600 | 0.20000 | | |
| " | 9 | −42.20000 | 1.20000 | 1.671629 | 38.798 |
| " | 10 | 20.27050 | 7.40000 | 1.433880 | 95.568 |
| " | 11 | −20.27050 | 0.20000 | | |
| " | 12 | 27.84500 | 1.70000 | 1.671629 | 44.405 |
| " | 13 | 18.00040 | 6.70000 | 1.433880 | 95.568 |
| " | 14 | −26.42594 | 1.30000 | 1.612658 | 44.405 |
| " | 15 | 216.06200 | 15.30000 | | |
| " | 16 | 29.04000 | 4.60000 | 1.723421 | 37.903 |
| " | 17 | −29.04000 | 1.80000 | 1.518230 | 58.903 |
| " | 18 | 13.46050 | | | |
| " | 29 | | $d_2$ | | |
| G2 | 30 | 75.04300 | 5.10000 | 1.622801 | 57.033 |
| " | 31 | −75.04300 | 2.00000 | 1.749501 | 35.191 |
| " | 32 | 1600.58000 | 7.50000 | | |
| " | 33 | 50.25600 | 5.10000 | 1.667551 | 41.963 |

TABLE 1-continued

| Lens | Surface No. | r (mm) | D (mm) | n (d) | ν (d) |
|---|---|---|---|---|---|
| " | 34 | −84.54100 | 1.80000 | 1.612658 | 44.405 |
| " | 35 | 36.91100 | 5.50000 | | |
| Mirror Tube Prism | 36 | 0.00000 | 30.00000 | 1.568829 | 56.048 |
| | 37 | 0.00000 | 143.8 | | |
| | | d2 = 100 mm | | | |

Figure 4:
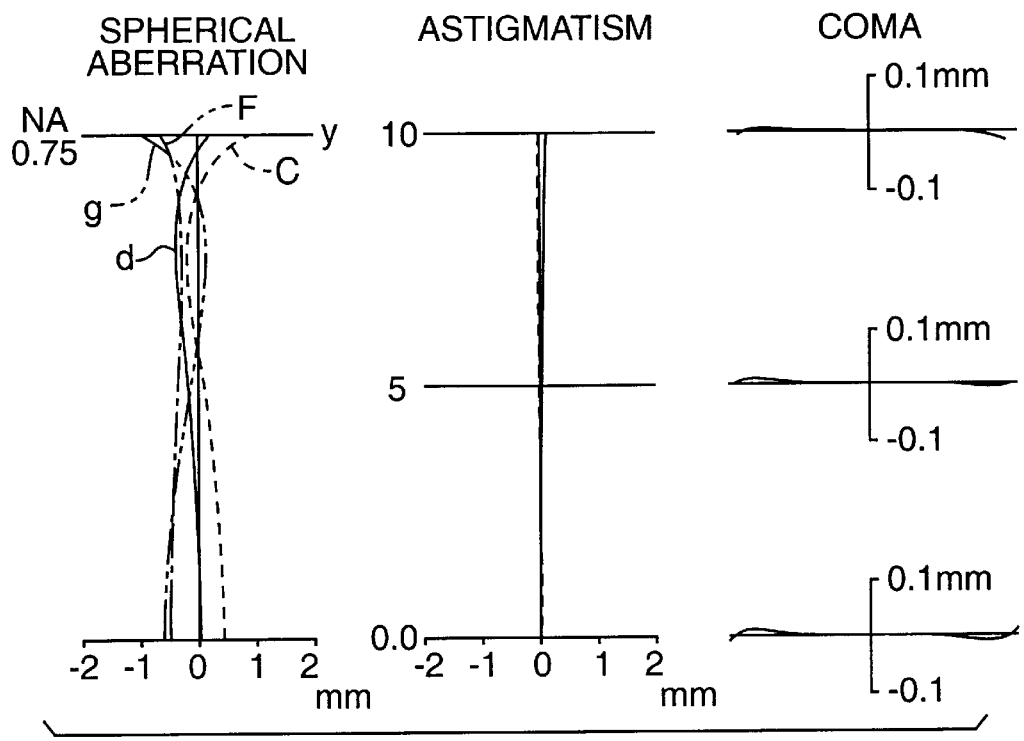
FIG. 4 includes plots of spherical aberration, astigmatism, and coma exhibited by the microscope objective lens of FIG. 3 as used with a cover glass thickness of 0.17 mm but without an adapter lens according to the invention.

Plots of spherical aberration, astigmatism, and coma for the first and second objective lenses as used with a cover glass thickness of t=0.17 mm are shown in FIG. 4. (For the spherical aberration plot in FIG. 4 as well as in FIGS. 5–7 and 9–10, the line denoted "C" pertains to C-line light (λ=656.28 nm), the line denoted "d" pertains to d-line light (λ=587.56 nm), the line denoted "F" pertains to F-line light (λ=486.13 nm), and the line denoted "g" pertains to g-line light (λ=435.84 nm)). All determinations are based on the axial space ($d_2$) between the first objective lens G1 and the second objective lens G2 being 100 mm.

Figure 5:
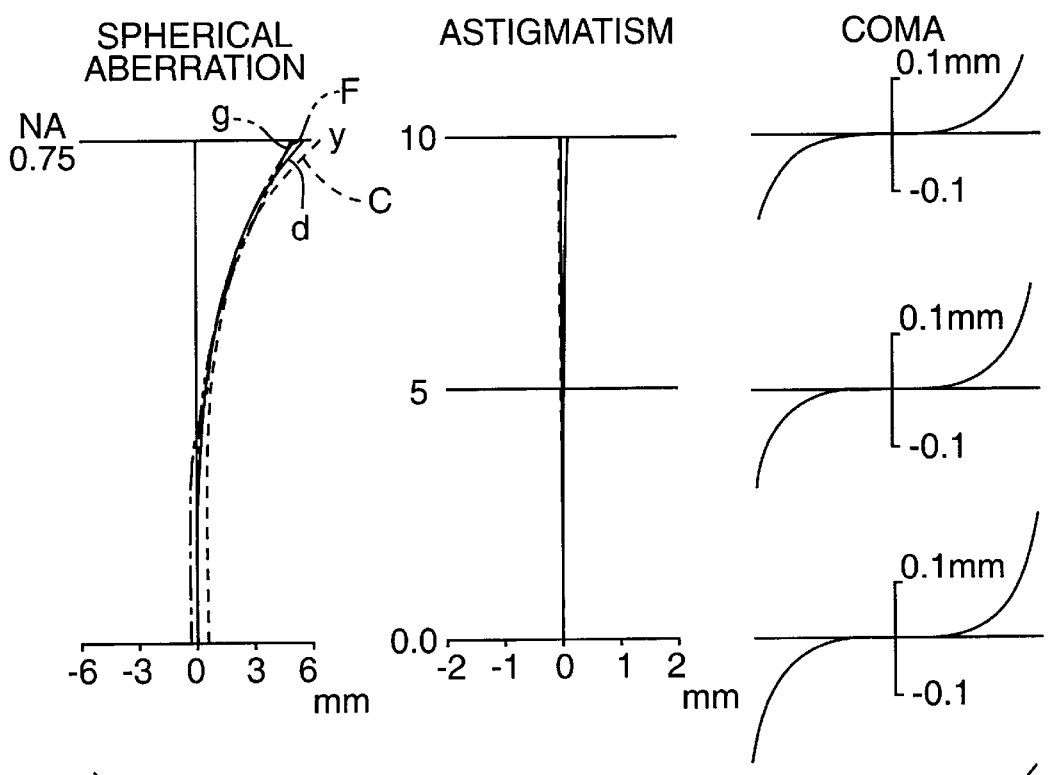
FIG. 5 includes plots of spherical aberration, astigmatism, and coma exhibited by the microscope objective lens of FIG. 3 as used with a cover glass thickness of 0.23 mm but without an adapter lens according to the invention.

In FIG. 5 are plots of spherical aberration, astigmatism, and coma for the first and second objective lenses as used with a cover-glass thickness of t=0.23 mm. Comparing FIGS. 4 and 5, it can be seen that FIG. 5 exhibits more pronounced aberrations than FIG. 4.

Table 2 lists specifications of the first and second objective lenses used together with an adapter according to the present invention.

TABLE 2

| Lens | Surface No. | r (mm) | D (mm) | n (d) | ν (d) |
|---|---|---|---|---|---|
| C. Glass | 1 | 0.00000 | t | 1.522160 | 58.802 |
| " | 2 | 0.00000 | $d_0$ | | |
| G1 | 3 | −4.80110 | 9.25000 | 1.693500 | 53.718 |
| " | 4 | −8.57140 | 0.10000 | | |
| " | 5 | −61.98900 | 5.55000 | 1.497820 | 82.516 |
| " | 6 | −13.88870 | 1.00000 | | |
| " | 7 | 83.46600 | 3.70000 | 1.497820 | 82.516 |
| " | 8 | −27.20600 | 0.20000 | | |
| " | 9 | −42.20000 | 1.20000 | 1.671629 | 38.798 |
| " | 10 | 20.27050 | 7.40000 | 1.433880 | 95.568 |
| " | 11 | −20.27050 | 0.20000 | | |
| " | 12 | 27.84500 | 1.70000 | 1.671629 | 44.405 |
| " | 13 | 18.00040 | 6.70000 | 1.433880 | 95.568 |
| " | 14 | −26.42594 | 1.30000 | 1.612658 | 44.405 |
| " | 15 | 216.06200 | 15.30000 | | |
| " | 16 | 29.04000 | 4.60000 | 1.723421 | 37.903 |
| " | 17 | −29.04000 | 1.80000 | 1.518230 | 58.903 |
| " | 18 | 13.46050 | $d_1$ | | |
| " | 19 | 32.36640 | 2.80000 | 1.501370 | 56.410 |
| Adapter | 20 | −75.62441 | 0.35821 | | |
| " | 21 | 343.65573 | 1.00000 | 1.766840 | 46.804 |
| " | 22 | 19.58420 | 3.10000 | 1.548139 | 45.869 |
| " | 23 | 264.09882 | 2.85775 | | |
| " | 24 | −26.08098 | 1.00000 | 1.802180 | 44.695 |
| " | 25 | −158.68382 | 1.20000 | | |
| " | 26 | −43.80436 | 0.93796 | 1.589130 | 61.088 |
| " | 27 | −488.98032 | 3.0000 | 1.531721 | 48.966 |
| " | 28 | −22.49337 | | | |
| " | 29 | | $d_2$ | | |
| G2 | 30 | 75.04300 | 5.10000 | 1.622801 | 57.033 |
| " | 31 | −75.04300 | 2.00000 | 1.749501 | 35.191 |
| " | 32 | 1600.58000 | 7.50000 | | |
| " | 33 | 50.25600 | 5.10000 | 1.667551 | 41.963 |
| " | 34 | −84.54100 | 1.80000 | 1.612658 | 44.405 |
| " | 35 | 36.91100 | 5.50000 | | |
| Mirror Tube Prism | 36 | 0.00000 | 30.00000 | 1.568829 | 56.048 |
| | 37 | 0.00000 | 143.8 | | |

TABLE 2-continued

| Lens | Surface No. | r (mm) | D (mm) | n (d) | ν (d) |
|---|---|---|---|---|---|
| | $d_1$ = 5 mm | | t = 0.17~0.23 mm | | |
| | $d_2$ = 78.55 mm | | $d_0$ = 1.398~1.392 mm | | |

Figure 6:
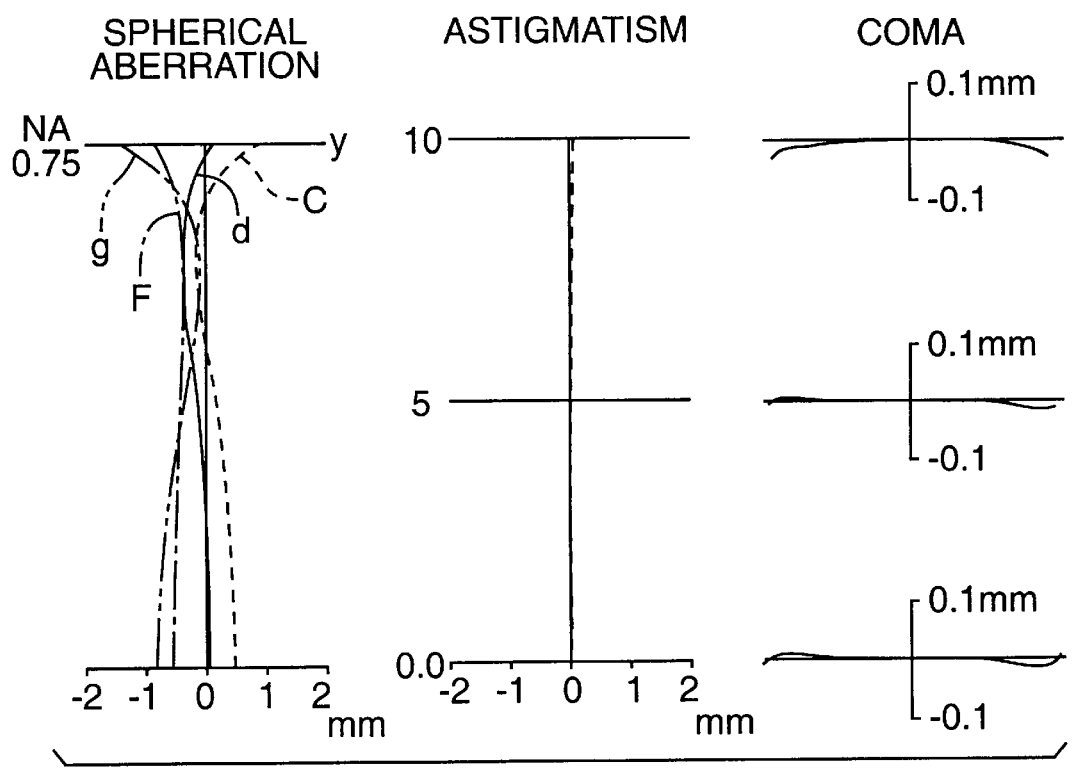
FIG. 6 includes plots of spherical aberration, astigmatism, and coma exhibited by the microscope objective lens of FIG. 3 as used with the adapter lens of Example Embodiment 1 and with a cover glass thickness of 0.17 mm.
Figure 7:
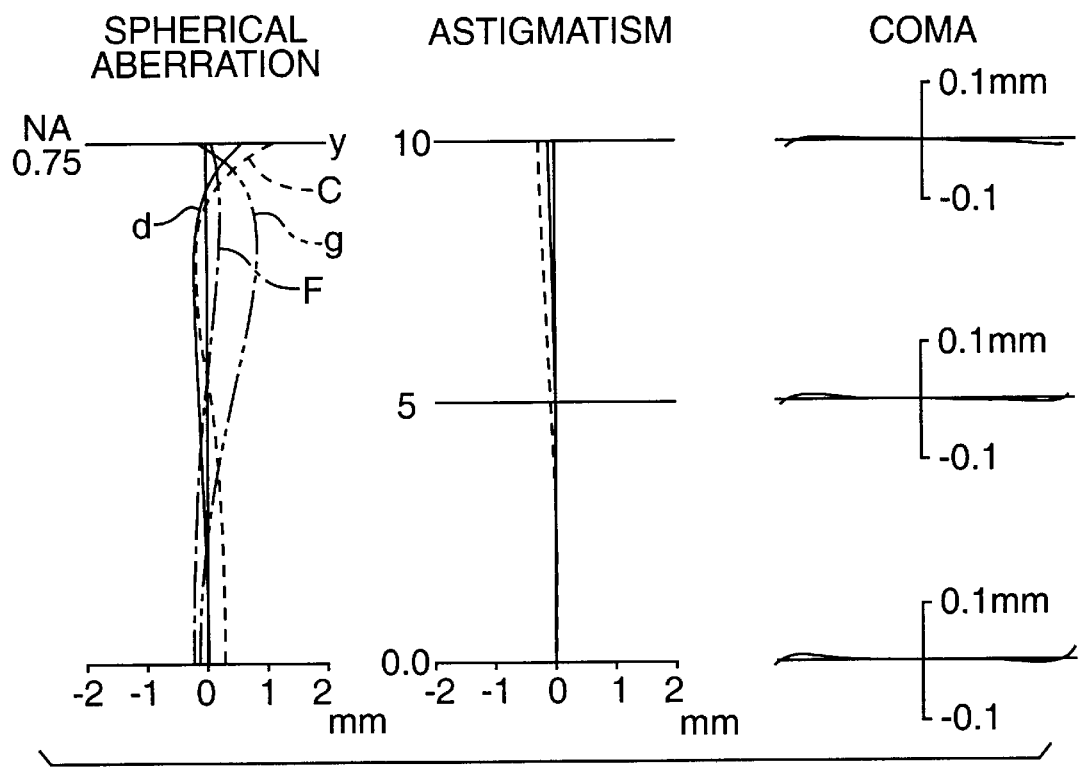
FIG. 7 includes plots of spherical aberration, astigmatism, and coma exhibited by the microscope objective lens of FIG. 3 as used with the adapter lens of Example Embodiment 1 and with a cover glass thickness of 0.23 mm.

FIGS. 6 and 7 are plots of spherical aberration, astigmatism, and coma exhibited by the objective lens system of FIG. 3 (with adapter according to this example embodiment inserted between the first objective lens G1 and the second objective lens G2) as used with a cover glass thickness (t) of 0.17 mm and 0.23 mm, respectively. As can be seen by comparing FIGS. 5 and 7, when the cover glass thickness (t) is changed from 0.17 mm to 0.23 mm, spherical aberration and other aberrations increase. However, by inserting an adapter according to this example embodiment between the first objective lens G1 and the second objective lens G2, spherical aberrations are corrected to a remarkable degree.

Example Embodiment 2

Figure 8:
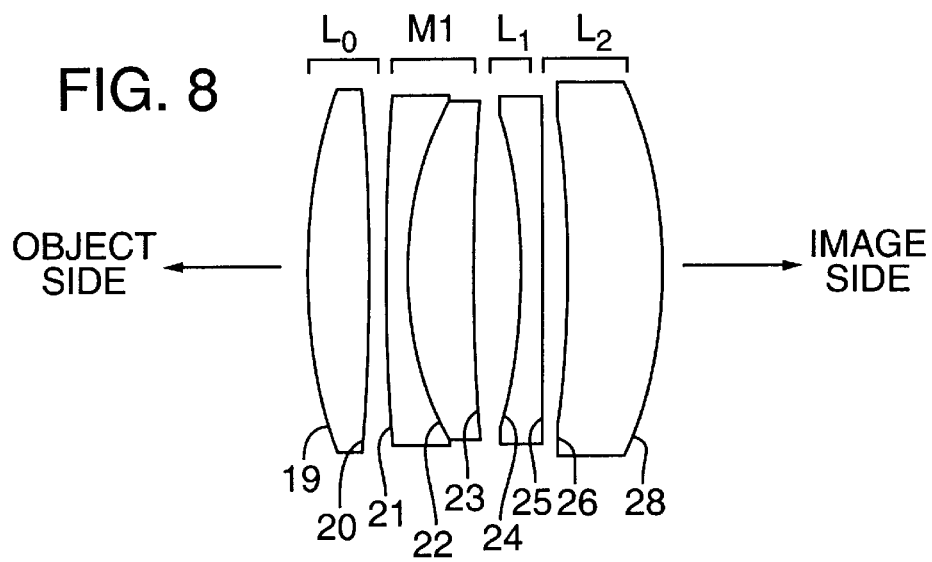
FIG. 8 is an optical diagram of an adapter lens according to Example Embodiment 2 of the invention.

FIG. 8 shows the lens configuration of an adapter according to this example embodiment. The microscope objective lens system with which the adapter is used is, by way of example, the same as used with the adapter of Example Embodiment 1. Lens specifications are listed in Table 3 below.

TABLE 3

| Lens | Surface No. | r (mm) | D (mm) | n (d) | ν (d) |
|---|---|---|---|---|---|
| C. Glass | 1 | 0.00000 | t | 1.522160 | 58.802 |
| " | 2 | 0.00000 | $d_0$ | | |
| G1 | 3 | −4.80110 | 9.25000 | 1.693500 | 53.718 |
| " | 4 | −8.57140 | 0.10000 | | |
| " | 5 | −61.98900 | 5.55000 | 1.497820 | 82.516 |
| " | 6 | −13.88870 | 1.00000 | | |
| " | 7 | 83.46600 | 3.70000 | 1.497820 | 82.516 |
| " | 8 | −27.20600 | 0.20000 | | |
| " | 9 | −42.20000 | 1.20000 | 1.671629 | 38.798 |
| " | 10 | 20.27050 | 7.40000 | 1.433880 | 95.568 |
| " | 11 | −20.27050 | 0.20000 | | |
| " | 12 | 27.84500 | 1.70000 | 1.671629 | 44.405 |
| " | 13 | 18.00040 | 6.70000 | 1.433880 | 95.568 |
| " | 14 | −26.42594 | 1.30000 | 1.612658 | 44.405 |
| " | 15 | 216.06200 | 15.30000 | | |
| " | 16 | 29.04000 | 4.60000 | 1.723421 | 37.903 |
| " | 17 | −29.04000 | 1.80000 | 1.518230 | 58.903 |
| " | 18 | 13.46050 | $d_1$ | | |
| Adapter | 19 | 32.65380 | 2.80000 | 1.501370 | 56.410 |
| " | 20 | −78.79597 | 1.31400 | | |
| " | 21 | 283.04932 | 1.00000 | 1.766840 | 46.804 |
| " | 22 | 19.43468 | 3.10000 | 1.548139 | 45.869 |
| " | 23 | 315.45581 | 1.72500 | | |
| " | 24 | −25.89658 | 1.00000 | 1.787971 | 47.465 |
| " | 25 | −165.70078 | 1.20000 | | |
| " | 26 | −38.28343 | 4.31014 | 1.575010 | 41.421 |
| " | 28 | −22.46741 | | | |
| " | 29 | | $d_2$ | | |
| G2 | 30 | 75.04300 | 5.10000 | 1.622801 | 57.033 |
| " | 31 | −75.04300 | 2.00000 | 1.749501 | 35.191 |
| " | 32 | 1600.58000 | 7.50000 | | |
| " | 33 | 50.25600 | 5.10000 | 1.667551 | 41.963 |
| " | 34 | −84.54100 | 1.80000 | 1.612658 | 44.405 |
| " | 35 | 36.91100 | 5.50000 | | |
| Mirror Tube Prism | 36 | 0.00000 | 30.00000 | 1.568829 | 56.048 |
| | 37 | 0.00000 | 143.8 | | |
| | $d_1$ = 5 mm | | t = 0.17~0.23 mm | | |
| | $d_2$ = 78.55 mm | | $d_0$ = 1.398~1.390 mm | | |

Figure 9:
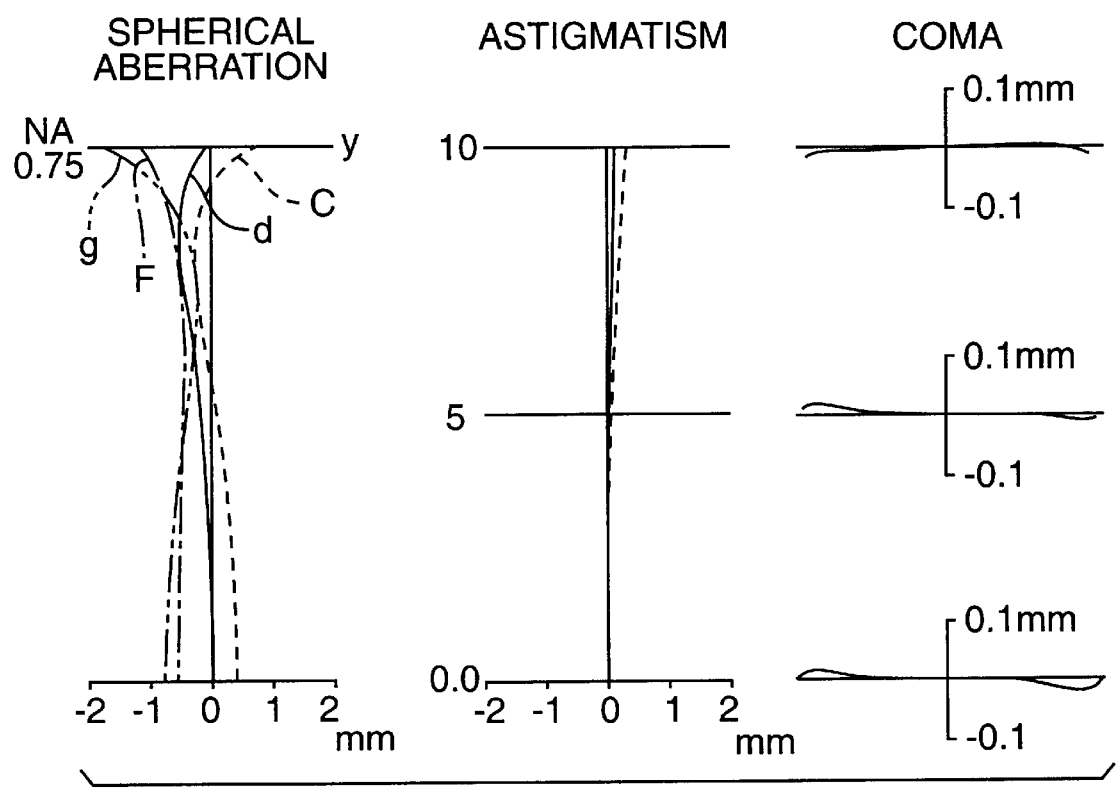
FIG. 9 includes plots of spherical aberration, astigmatism, and coma exhibited by microscope objective lens of FIG. 3 as used with the adapter lens of Example Embodiment 2 and with a cover glass thickness of 0.17 mm.
Figure 10:
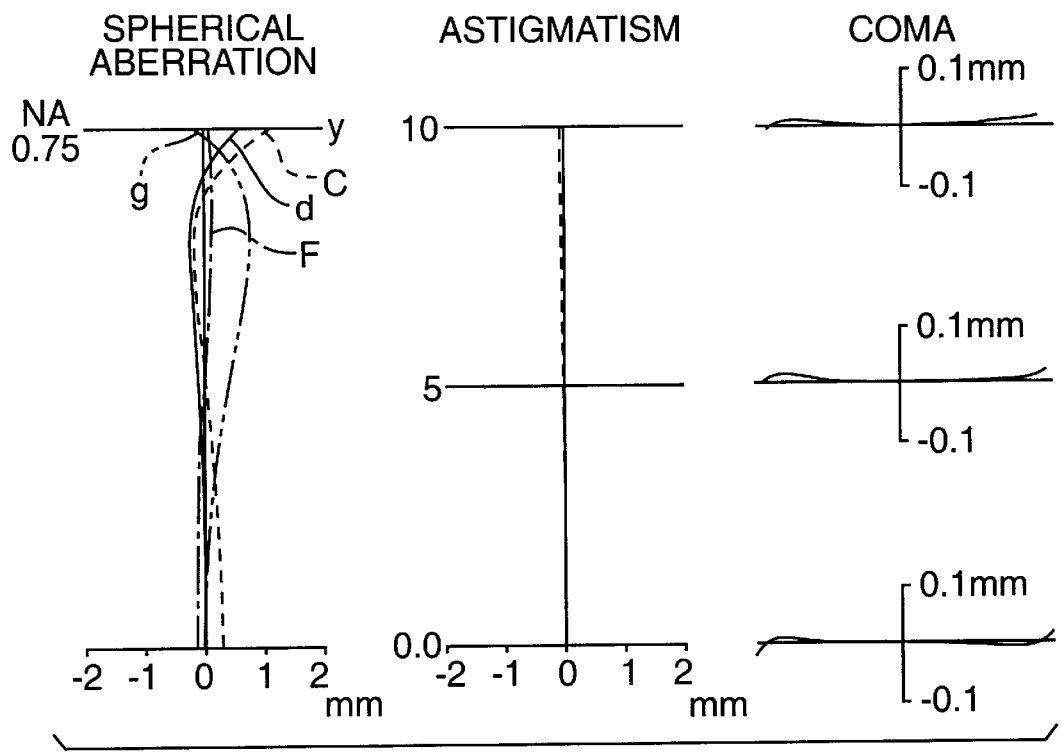
FIG. 10 includes plots of spherical aberration, astigmatism, and coma exhibited by microscope objective lens of FIG. 3 as used with the adapter lens of Example Embodiment 2 and with a cover glass thickness of 0.23 mm.

FIGS. 9 and 10 are plots of spherical aberration, astigmatism, and coma exhibited by a microscope objective lens system as shown in FIG. 3 used with an adapter according to this example embodiment and with a coverglass thickness of t=0.17 mm and 0.23 mm, respectively. As can be seen by comparing FIG. 5 with FIG. 10, when the cover glass thickness (t) is changed from 0.17 mm to 0.23 mm (and without an adapter present), spherical aberrations and other aberrations increase. However, by inserting the adapter of this example embodiment and axially moving the movable lens group to an appropriate position, spherical aberrations are corrected to a remarkable degree.

In Example Embodiments 1 and 2, the light flux on the object side and the image side of the subject adapter is parallel to the optical axis. Thus, the same beneficial function of reducing spherical aberrations can be realized by reversing the lens configuration of the adapter.

Values of variables and of conditions (1)–(4) as exhibited by Example Embodiments 1 and 2 are listed in Table 4 below.

| Variable | Example Embodiment 1 | Example Embodiment 2 |
|---|---|---|
| $n_P$ | 1.766840 | 1.766840 |
| $n_N$ | 1.548139 | 1.531721 |
| $r_1$ | 19.5842 | 19.43468 |
| Condition (1) | 0.0112 | 0.121 |
| $f_P$ | 38.418 | 38.809 |
| $f_N$ | −27.119 | −27.257 |
| Condition (2) | 0.1724 | 0.17486 |
| $v_P$ | 45.869 | 48.966 |
| $v_N$ | 46.804 | 46.804 |
| Condition (3) | −0.02038 | 0.02137 |
| $f_2$ | 89.487 | 86.02 |
| $f_1$ | −39.038 | −39.076 |
| Condition (4) | 0.392523 | 0.3752 |

Therefore, with an adapter according to this invention, spherical aberrations and other aberrations imparted to a objective lens system by variations in the thickness of a "cover glass" can be corrected to a high degree. By attaching such an adapter to an existing objective lens system, spherical aberrations can be controlled to the desired degree. It will be understood that, in addition to microscope objective lens systems, an adapter according to the invention can also be used with other optical systems such as a camera optical system.

Whereas the invention has been described in connection with several example embodiments, it will be understood that the invention is not limited to those embodiments. On the contrary, the invention is intended to encompass all alternatives, modifications, and equivalents as may be included within the spirit and scope of the invention as defined by the appended claims.

What is claimed is:

1. An adapter for correcting spherical aberration of an objective lens, the adapter comprising, from an object side to an image side on an optical axis:
   (a) a movable lens group comprising a negative lens cemented to a positive lens to define a cemented surface having negative refractive power and a curvature radius $r_1$, the movable lens group being axially movable on the optical axis;
   (b) the adapter satisfying the condition:

$$|(n_N-n_P)/r_1|<0.3$$

wherein $n_P$ is the refractive index of the positive lens and $n_N$ is the refractive index of the negative lens; and
   (c) the adapter being axially mountable to an image side of an objective lens to allow correction, by axially moving the movable lens group relative to the objective lens system, of spherical aberration of an image formed by the objective lens.

2. The adapter of claim 1, further satisfying the conditions:

$$-0.6<(f_P+f_N)/(f_P-f_N)<0.6$$

$$-0.4<(v_P-v_N)/v_P<0.4$$

wherein $f_P$ is the focal length of the positive lens, $f_N$ is the focal length of the negative lens, $v_P$ is the Abbe number (relative to d-line light) of the positive lens, and $v_N$ is the Abbe number (relative to d-line light) of the negative lens.

3. The adapter of claim 2, further comprising:
   a first lens group situated imagewise of the movable lens group, the first lens group having negative refractive power and a focal length $f_1$; and
   a second lens group situated imagewise of the first lens group, the second lens group having positive refractive power and a focal length $f_2$, the adapter further satisfying the condition:

$$-0.6<(f_2+f_1)/(f_2-f_1)<0.6.$$

4. The adapter of claim 3, further comprising a positive lens situated objectwise of the movable lens group.

5. The adapter of claim 1, further comprising:
   a first lens group situated imagewise of the movable lens group, the first lens group having negative refractive power and a focal length $f_1$; and
   a second lens group situated imagewise of the first lens group, the second lens group having positive refractive power and a focal length $f_2$, the adapter further satisfying the condition:

$$-0.6<(f_2+f_1)/(f_2-f_1)<0.6.$$

6. The adapter of claim 5, further comprising a positive lens situated objectwise of the movable lens group.

7. An objective lens system, comprising, objectwise to imagewise on an optical axis:
   (a) an objective lens; and
   (b) an adapter removably attached to the image side of the objective lens and coaxial with the objective lens when attached to the objective lens, the adapter comprising a movable lens group comprising a negative lens cemented to a positive lens to define a cemented surface having negative refractive power and a curvature radius $r_1$, the movable lens group satisfying the condition:

$$|(n_N-n_P)/r_1|<0.3$$

wherein $n_P$ is th e refractive index of th e positive lens and $n_N$ is the refractive index of the negative lens, the movable lens group being movable on the optical axis relative to the objective lens to adjust an amount of spherical aberration produced by the objective lens.

8. The lens system of claim 7, wherein the adapter further satisfies the conditions:

$$-0.6<(f_P+f_N)/(f_P-f_N)<0.6$$

$$-0.4<(v_P-v_N)/v_P<0.4$$

wherein $f_P$ is the focal length of the positive lens, $f_N$ is the focal length of the negative lens, $v_P$ is the Abbe number (relative to d-line light) of the positive lens, and $v_N$ is the Abbe number (relative to d-line light) of the negative lens.

9. The lens system of claim 8, wherein the adapter further comprises:
- a first lens group situated imagewise of the movable lens group, the first lens group having negative refractive power and a focal length $f_1$; and
- a second lens group situated imagewise of the first lens group, the second lens group having positive refractive power and a focal length $f_2$, the adapter further satisfying the condition:

$$-0.6 < (f_2+f_1)/(f_2-f_1) < 0.6.$$

10. The lens system of claim 7, wherein the adapter further comprises:
- a first lens group situated imagewise of the movable lens group, the first lens group having negative refractive power and a focal length $f_1$; and
- a second lens group situated imagewise of the first lens group, the second lens group having positive refractive power and a focal length $f_2$, the adapter further satisfying the condition:

$$-0.6 < (f_2+f_1)/(f_2-f_1) < 0.6.$$

11. The lens system of claim 10, wherein the spherical-aberration-correcting lens group further comprises:
- a first lens group situated imagewise of the movable lens group, the first lens group having negative refractive power and a focal length $f_1$; and
- a second lens group situated imagewise of the first lens group, the second lens group having positive refractive power and a focal length $f_2$, the spherical-aberration-correcting lens group further satisfying the condition:

$$-0.6 < (f_2+f_1)/(f_2 f_1) < 0.6.$$

12. An objective lens system exhibiting variable spherical aberration correction, the lens comprising objectwise to imagewise on an optical axis:
- (a) a first objective lens;
- (b) a second objective lens; and
- (c) a spherical-aberration-correcting lens group situated between the first objective lens and the second objective lens, the spherical-aberration-correcting lens group comprising an axially movable cemented lens including a negative lens cemented to a positive lens for adjusting the spherical aberration of the first objective lens and the second objective lens, the spherical-aberration-correcting lens group being removable from between the first objective lens and the second objective lens.

13. The lens system of claim 12, wherein the cemented lens has a cemented surface having a negative refractive power, the lens system satisfying the condition:

$$|(n_N - n_P)/r_1| < 0.3$$

wherein $r_1$ is the curvature radius of the cemented surface, $n_P$ is the refractive index of the positive lens and $n_N$ is the refractive index of the negative lens of the cemented lens.

14. The lens system of claim 13, further satisfying the conditions:

$$-0.6 < (f_P+f_N)/(f_P-f_N) < 0.6$$

$$-0.4 < (v_P-v_N)/v_P < 0.4$$

wherein $f_P$ is the focal length of the positive lens, $f_N$ is the focal length of the negative lens, $v_P$ is the Abbe number (relative to d-line light) of the positive lens and $v_N$ is the Abbe number (relative to d-line light) of the negative lens.

* * * * *

UNITED STATES PATENT AND TRADEMARK OFFICE
CERTIFICATE OF CORRECTION

PATENT NO. : 5,978,155
DATED : November 2, 1999
INVENTOR(S) : Yutaka Suenaga

It is certified that error appears in the above-identified patent and that said Letters Patent is hereby corrected as shown below:

Column 6,
Line 55, "lens $L_2$" should be -- lens $L_1$ --.

Column 9,
Line 10, "d2" should be -- $d_2$ --.

Signed and Sealed this

Eighteenth Day of September, 2001

Attest:

NICHOLAS P. GODICI
*Attesting Officer*     *Acting Director of the United States Patent and Trademark Office*